Patented May 29, 1945

2,377,167

UNITED STATES PATENT OFFICE 2,377,167

GUANIDINE PENTACHLORPHENATE

Vartkes Migrdichian, Greenwich, Conn., assignor to American Cyanamid Company, New York, N. Y., a corporation of Maine No Drawing. Application February 11, 1942, Serial No. 430,360

3 Claims. (Cl. 167—38)

The present invention relates to guanidine pentachlorphenate as a new compound and its use as a fungicide particularly applicable to the treatment of seed borne diseases.

The compound in question may be readily prepared by reacting molecular equivalents of an alkali metal pentachlorphenate such as the sodium salt with a guanidine salt such as guanidine hydrochloride, sulfate or nitrate. Sodium pentachlorphenate and guanidine hydrochloride are preferred from the standpoint of cost and availability.

Solutions of the reactants are brought together either at room temperature or slightly above, whereupon a reaction occurs and guanidine pentachlorphenate is precipitated as a white, crystalline powder, which is substantially insoluble in water. The reaction mass is filtered, washed and the guanidine pentachlorphenate dried.

It has been found that this material is a particularly good fungicide, especially for the treatment of seed borne diseases.

When so used, the seed to be treated may be dusted with a mixture containing from $\frac{1}{10}$ to 10% of the guanidine pentachlorphenate, the remainder being an inert material such as talc, kieselguhr, clay or the like.

A mixture of 1% guanidine pentachlorphenate and 99% talc is preferred as this concentration proves to be not only adequately effective but maintains its toxicity over long periods of time due to the substantial insolubility of the active ingredient.

A composition containing 1% of the above active ingredient and 99% talc, when dusted on corn infected with the following organisms and put through germination tests, gave the following results:

| Infecting organism | Control |
|---|---|
| | Percent |
| Aspergillus | 66 |
| Rhizopus | 80 |
| Penicillium | 100 |
| Undesignated Saprophytes | 100 |

The above results were obtained with minimum damage to the corn as the germination was abundant and healthy.

The effectiveness of this compound and its lack of injurious characteristics are probably due in large measure to the mild alkalinity of the guanidine radical.

Cloth may first be steeped in a water solution of a guanidine salt and a solution of an alkali metal pentachlorphenate added thereto, whereupon the guanidine pentachlorphenate will be precipitated in and on the cloth. Upon drying, such fabric is objectionable from a food standpoint to larvae of the clothes moth due in part to its guanidine content. The remaining part of the radical is likewise of assistance in this repelling action inasmuch as it involves a phenol derivative. Obviously, where desired, additional toxic agents may be added to a mixture containing guanidine pentachlorphenate for combatting seed borne diseases. For instance, the mixture may also contain such compounds as cadmium oxide and carbonate and/or mercury phenyl cyanamide or the like, although these additionals are not essential.

While the invention has been described with particular reference to specific embodiments, it is to be understood that it is not to be limited thereto but is to be construed broadly and restricted solely by the scope of the appended claims.

I claim:

1. Guanidine pentachlorphenate.
2. A seed borne disease control composition containing from .1% to 10% of guanidine pentachlorphenate.
3. Guanidine pentachlorphenate and a solid carrier therefor.

VARTKES MIGRDICHIAN.